United States Patent [19]

Kiehl et al.

[11] Patent Number: 4,670,407
[45] Date of Patent: Jun. 2, 1987

[54] REFRACTORIES WITH A HIGH CONTENT OF ALUMINA AND THE PROCESS FOR THEIR PRODUCTION

[75] Inventors: Jean-Pierre Kiehl; Daniel Kuster, both of Lyons, France

[73] Assignee: Savoie Refractaires, Lyons, France

[21] Appl. No.: 743,741

[22] Filed: Jun. 12, 1985

[30] Foreign Application Priority Data

Jun. 13, 1984 [FR] France ................................ 84 09221

[51] Int. Cl.$^4$ ...................... C04B 35/10; C04B 35/56; C04B 35/58
[52] U.S. Cl. ........................................ 501/87; 501/96; 501/98
[58] Field of Search ...................... 501/96, 98, 100, 87

[56] References Cited

U.S. PATENT DOCUMENTS 2,599,185  6/1952  Lepp et al. ............................. 501/99
2,922,213  1/1960  Bollack et al. ........................ 501/96
4,341,533  7/1982  Daire et al. ............................ 501/87

FOREIGN PATENT DOCUMENTS 641647    5/1962   Canada ................................. 501/96
1100865   1/1968   United Kingdom .
2040911   9/1980   United Kingdom .
2075965  11/1981   United Kingdom .

OTHER PUBLICATIONS

Chemical Abstracts vol. 73, No. 18076w.

Primary Examiner—Mark L. Bell
Attorney, Agent, or Firm—Sandler & Greenblum

[57] ABSTRACT

The invention relates to new refractories with a high content of alumina and the process for their production. The refractories are made up of alumina particles held by a binder capable of withstanding a reducing atmosphere at 850° C. The refractories are characterized by low porosity and high mechanical strength and are also inert towards coal ashes and slags at these temperatures. The binder used in the refractories consists of a combination of aluminum nitride and aluminum oxycarbide. The carbon required to the formation of the carbon oxide may be introduced in a form of carbon black or graphite, or may originate from a decomposition of a provisional or organic binder.

9 Claims, No Drawings

REFRACTORIES WITH A HIGH CONTENT OF ALUMINA AND THE PROCESS FOR THEIR PRODUCTION

BACKGROUND OF THE INVENTION

1. Field of the Invention

The present invention relates to novel refractories with a very high content of alumina.

2. Discussion of Background and Material Information

Refractories containing more than 95% by weight of alumina have been known for many years in the refractory industry, and are employed in large tonnages, for example, in petro-chemical reactors, such as secondary ammonia reactors or reactors for the synthesis of methanol.

Although refractories have high melting points, which are typically above 2,000° C., the maximum temperature of use nevertheless is below 1,500° C. when refractories are employed above this temperature, rapid spalling of the bricks frequently occurs, or the refractories may be crushed under the weight of the pressure exerted by the expansion of masonry at such temperatures. This deficiencies are due to the fact that at temperatures above 1,500° C., the mechanical properties of the refractories deteriorate. For example, the compressive strength falls abruptly from 1,000 bars to values of a few bars, both in an oxidizing atmosphere and in a reducing atmosphere.

In an attempt to overcome these deficiencies, corundum has been bound with mullite binder in the production of refractories. This enables their range of application to be extended to temperatures up to 1,700°/1,750° C. in an oxidizing atmosphere.

In a reducing atmosphere, however, the addition of mullite is not possible because silica, when reduced, is volatilized as SiO which renders the corundum bricks spongy and friable. Although carbon-based refractories can then be employed, industrial units which operate above 1,500° C. in a reducing atmosphere are encountered more and more frequently in the evolution of advancing technology, often giving rise to slags as by-products which are rich and readily reducible compounds such as $SiO_2$, $Fe_2O_3$ or $TiO_2$, so that pure carbon is not particularly suitable as a refractory material. Furthermore, the open porosity of conventional refractories does not drop below 15% in the best of cases, unless a fusible phase is added to them, which has many other disadvantages, the greatest being that it reduces the refractoriness.

Recently, attempts have been made to solve these problems by using graphite, silicon nitride, or sialon as binder. Sialon is a solid solution of alumina in silicon nitride, having the following empirical formula: $Si_{(6-z)}Al_zN_{8-x}O_z$, where z=1 to 4.

Graphite-corundums reach moduli of rupture of 80 to 100 kg/cm² at 1,500° C., which is clearly better than those of pure corundum, but is still inadequate for some applications involving mechanical erosion, such as coke beds, ore beds, and the like. Although the porosity of these graphic-corundum refractories can be kept below 15%, typically this involves blocking pores rather than causing a chemical reaction between corundum and graphite. In any any event, graphite-corundum refractories remain highly sensitive to oxidation.

Silicon nitride-corundum or sialon-corundum refractories reach moduli of rupture when hot which are above 200 kg/cm² at 1,500° C., but on becoming oxidized they produce silica which readily reacts with iron oxides and other components of slags, forming fusible glasses. Moreover, the nitride or sialon binder tends to decompose thermally above 1,600°/1,650° C., which also releases highly reactive silica. As a result, these refractories are rather sensitive to corrosion, to the slags produced in iron steel metallurgy, and to coal ashes above these temperatures. Furthermore, these refractories also cannot be produced economically with a low porosity.

There is, therefore, an unsatisfied need for refractories which are stable at a high temperature in a reducing atmosphere which exhibits high mechanical strength and low porosity, and which do not tend to release silica.

SUMMARY OF THE INVENTION

An object of the present invention is to provide refractories with a melting point above 1,800° C., which are stable at this temperature in a reducing atmosphere which possess an open porosity of less than 15% and a modulus of rupture which is higher than 200 bars at 1,500° C.

Another object of the present invention is to provide a refractory for use at higher temperatures, having a composition comprising more than 95% by total weight of oxide, nitride and carbon-containing aluminum compounds, and less than 1% by total weight of silicon dioxide.

A further object of the present invention is to provide refractories including aluminum oxide particles which range in size from 0.1 to 5 mm, with at least one half by weight of the particles being larger than 0.2 mm.

A still further object of the present invention is to provide refractories including a binder composed of a combination of aluminum nitride, aluminum carbide, and aluminum oxide in the form of an aluminum oxycarbonitride compound. The combination of these three compounds, i.e., aluminum nitride, aluminum carbide, and aluminum oxide, makes it possible to produce improved refractories having properties which are superior to conventional refractories as to mechanical strength when hot, a lack of aluminum oxide, hydration resistance, a lack of aluminum carbide, resistance to sudden temperature variations, and a lack of aluminum nitride.

DETAILED DESCRIPTION

The process for producing refractory material in accordance with the present invention involves the following stages:

(1) preparing a mixture including:
- (a) 50 to 80% by total weight of particles of electrofused or sintered corundum having a particle size ranging in size from 0.1 to 5 mm, with at least one half by weight of the particles being larger than 0.2 mm which forms the skeleton of the brick,
- (b) 20 to 50% by total weight of a final binder including:
  - (i) 5 to 20% by total weight of ultrafine alumina having a particle size of less than 100 micrometers,
  - (ii) 5 to 20% by total weight of aluminum powder having a particle size of less than 200 micrometers,
  - (iii) 0.5 to 5% by total weight of carbon selected either from a binder residue or from lampblack, or from a mixture of both, or alternatively from a microcrystalline graphite, the quantity of carbon being reduced, if appropriate, by a quantity equal to that of the carbon produced by the decomposition of a milling liquid, (iv) 0.5 to 4% by total weight of a catalyst for nitriding and carbiding selected from the group of iron oxide and titanium oxide, lime and magnesia, all of the previously mentioned quantities being given by weight and related to the total weight of the mixture;

(2) milling the mixture with a suitable quantity of milling liquid and then shaping by pressing under a minimum pressure of 600 bars, and preferably at approximately 1,000 bars.

(3) firing up to at least 1,250° C., and preferably at about 1,500° C. in a reducing atmosphere containing nitrogen, or in pure nitrogen.

The conversion of the provisional or precursor binder to the definitive or final binder takes place in two stages after the disappearance of the liquid or liquids as follows.

Starting from 700° C. and up to 1,200° C., the phenomenon of aluminum nitriding is observed, with the formation of AlN. This reaction, which is accompanied by an increase in weight and volume, slows down as a result of a lack of available nitrogen in the bulk material. In accordance with the present invention, the refractories are subjected to another reaction giving rise to a refractory binder, the components of which are already in place and are responsible for the formation of a mechanically strong dense brick having a low density.

This reaction results with the formation of aluminum oxycarbide, which takes place between the residual alumina, the ultrafine alumina and the highly reactive carbon deliberately added for this purpose. It is consequently the combination of these two binders, namely the already formed AlN and the oxycarbide, which are both stable above 1,850° C. which gives rise to the remarkable properties of this new refractory. The resultant binder oxidizes only very slowly in depth, because it then gives rise to a very impervious layer of alpha alumina which does not spall from the brick, and does not cause it to swell. As a result of its thermal stability, this complex binder is especially resistant to the slags produced in iron and steel metallurgy, even when they are rich in lime and in iron oxide. This makes this corundum brick particularly suitable for liming iron or steelmaking units of the H.F. type, ladles, continuous tapping nozzles, as well as coal-gasification reactors producing liquid ashes.

It has also been unexpectedly discovered that the firing results in substantially no variation of volume which is contrary to the sintering of alumina powder and allows for a better precision as to final dimensions of the product.

The invention will be illustrated by the following nonlimiting examples:

EXAMPLE 1

A mixture consisting of the following components was milled together:

| | |
|---|---|
| black corundum 5-2 mm | 30% |
| black corundum 2-0.2 mm | 30% |
| black corundum 0-0.2 mm | 5% |
| alumina (fines) <50 micrometers | 15% |
| aluminum <74 micrometers | 15% | with 5% of phenolic resin used as a provisional binder and source of carbon.

The chemical analysis of the solid starting materials was as follows:

| | Black Corundum | Alumina | Aluminum |
|---|---|---|---|
| $Al_2O_3$ | 96.25 | 99.45 | — |
| Al | — | — | 99.30 |
| $SiO_2$ | 0.75 | 0.10 | — |
| $TiO_2$ | 2.45 | 0.05 | — |
| $Fe_2O_3$ | 0.15 | 0.05 | 0.40 |
| CaO | 0.10 | 0.01 | — |
| MgO | 0.10 | 0.01 | 0.05 |
| $Na_2O$ | 0.10 | 0.32 | — |
| $K_2O$ | 0.10 | 0.01 | — |
| | 100.00 | 100.00 | 100.00 |

The $TiO_2$, Which acts as a catalyst, is added via the black corundum.

The mixture of powders and resin was pressed at a pressure of 1,000 bars to form bricks, which were fired at 1,400° C. under nitrogen.

The results of measurements and inspections carried out on these bricks were as follows:

| | | |
|---|---|---|
| Apparent density | 3.05 | $g/cm^3$ |
| Open porosity | 10% | |
| Compressive strength at 20° C. | 1,500 | bars |
| Modulus of rupture at 20° C. | 280 | bars |
| Modulus of rupture at 1,500° C. | 230 | bars |

The weight change during one hour's treatment at 1,850° C. in a CO atmosphere was <1% per hour.

EXAMPLE 2

A mixture consisting of the following components:

| | |
|---|---|
| black corundum 5-2 mm | 30% |
| black corundum 2-0.2 mm | 20% |
| alumina <50 micrometers | 20% |
| aluminum <74 micrometers | 12% |
| carbon black | 3% | was milled together with a provisional binder consisting of 1% of Avebene and 4% of furfural. Avebene (registered trademark) is a mixture of lignin and lignin sulfates and sulfites.

The chemical analysis of the solid starting materials was as follows:

| | Black Corundum | Alumina | Aluminum |
|---|---|---|---|
| $Al_2O_3$ | 96.25 | 99.45 | — |
| Al | — | — | 99.30 |
| $SiO_2$ | 0.75 | 0.10 | 0.25 |
| $TiO_2$ | 2.45 | 0.05 | — |
| $Fe_2O_3$ | 0.15 | 0.05 | 0.40 |
| CaO | 0.10 | 0.01 | — |
| MgO | 0.10 | 0.01 | 0.05 |
| $Na_2O$ | 0.10 | 0.32 | — |
| $K_2O$ | 0.10 | 0.01 | — |
| | 100.00 | 100.00 | 100.00 |

The $TiO_2$ which acts as catalyst is incorporated in the blacx corundum.

The procedure was essentially the same as in Example 1 and the results of measurements and inspections carried out on the brick were as follows:

| | |
|---|---|
| Apparent density | 1.90 g/cm³ |
| Open porosity | 12% |
| Compressive strength at 20° C. | 1,800 bars |
| Modulus of rupture at 20° C. | 250 bars |
| Modulus of rupture at 1,500° C. | 210 bars |

The weight changes during one hour's treatment at 1,850° C. in a CO atmosphere were <1%.

EXAMPLE 3

A mixture consisting of the following components:

| | |
|---|---|
| Tabular alumina 1.170–2.38 mm | 30% |
| Tabular alumina 0.52–1.17 | 30% |
| Alumina <50 micrometers | 19% |
| Aluminum <74 micrometers | 12% |
| Iron oxide | 1% |
| Microcrystalline graphite | 3% | was milled together with 5% of phenolic resin used as a provisional binder and source of carbon.

The chemical analysis of the solid starting materials was as follows:

| | Tabular Alumina | Alumina | Aluminum | Iron Oxide |
|---|---|---|---|---|
| $Al_2O_3$ | 99.39 | 99.45 | — | — |
| Al | — | — | 99.30 | — |
| $SiO_2$ | 0.04 | 0.10 | 0.25 | 0.2 |
| $TiO_2$ | 0.05 | 0.05 | — | — |
| $Fe_2O_3$ | 0.02 | 0.05 | 0.40 | 99.7 |
| CaO | 0.05 | 0.01 | — | — |
| MgO | 0.05 | 0.01 | 0.05 | — |
| $Na_2O$ | 0.30 | 0.32 | — | 0.1 |
| $K_2O$ | 0.10 | 0.01 | — | — |
| | 100.00 | 100.00 | 100.00 | 100.00 |

The procedure was essentially the same as in Example 1 and the results of the measurements and inspections carried out on the brick were as follows:

| | |
|---|---|
| Apparent density | 2.75 g/cm³ |
| Open porosity | 14% |
| Compressive strength at 20° C. | 1,200 bars |
| Modulus of rupture at 20° C. | 240 bars |
| Modulus of rupture at 1,500° C. | 220 bars |

The weight change during one hour's treatment at 1,850° C. in a CO atmosphere was <1%.

What is claimed is:

1. Refractory material for use at high temperatures consisting essentially of more than 95% by weight of aluminum oxide particles having a particle size ranging from 0.1 to 5 mm with at least one half by weight of the particles being larger than 0.2 mm and less than 1% by weight of silicon oxide bound by a binder consisting essentially of aluminum nitride and aluminum oxycarbide.

2. The refractory material for use at high temperatures in accordance with claim 1, wherein said material has a melting point above 1,850° C., is stable at said temperature in a reducing atmosphere, has an open porosity of less than 15%, and a modulus of rupture greater than 200 bars at 1,500° C.

3. A method for producing a refractory material comprising:
   (1) preparing a mixture consisting essentially of:
      (a) 50% to 80% by total weight of particles selected from the group consisting of electrofused corundum, sintered corundum and mixtures of electrofused and sintered corundum having a particle size ranging from 0.1 to 5 mm with at least one half by weight of the particles being larger than 0.2 mm,
      (b) 20% to 50% of a binder consisting essentially of:
   3 (i) 5% to 20% by total weight of ultrafine alumina having a particle size less than 100 micrometers,
      (ii) 5% to 20% by total weight of aluminum powder having a particles size less than 200 micrometers,
      (iii) 0.5% to 5% by total weight of carbon selected from the group consisting of an organic resin binder residue, lampblack, a mixture of an organic resin binder residue and lampblack, microcrystalline graphite carbon originating from a member selected from the group consisting of an in situ organic binder residue, a milling liquid in situ residue, and a mixture of an in situ organic binder residue and a milling liquid in situ residue,
      (iv) 0.5% to 4% by total weight of a nitriding and carbiding catalyst selected from the group consisting of iron oxide, titanium oxide, lime and magnesia
   (2) milling said mixture with a milling organic resin and then shaping by pressing at a minimum pressure of 600 bars; and
   (3) firing at a minimum temperature of 1,250° C. in a reducing atmosphere.

4. The method in accordance with claim 3, wherein the milling organic resin is a liquid organic resin which decomposes to provide the totality of the carbon required for the formation of aluminum carbide.

5. The method in accordance with claim 4, wherein the milling organic resin liquid contains a member selected from the group consisting of phenolic resin and furfuryl resin.

6. The method in accordance with claim 3 wherein said minimum pressure is a pressure of approximately 1,000 bars.

7. The method in accordance with claim 3 wherein said minimum temperature is approximately 1,500° C.

8. The method in accordance with claim 3 wherein said firing is performed in the presence of nitrogen.

9. The method in accordance with claim 3 wherein said firing is performed in an atmosphere of pure nitrogen.

* * * * *

UNITED STATES PATENT AND TRADEMARK OFFICE
CERTIFICATE OF CORRECTION

PATENT NO. : 4,670,407
DATED : June 2, 1987
INVENTOR(S) : Jean-Pierre KIEHL et al.

It is certified that error appears in the above-identified patent and that said Letters Patent is hereby corrected as shown below:

At column 1, line 25, change "This" to ---These---.
At column 1, line 20, change "when" to ---When---.
At column 4, line 22, change "Which" to ---which---.
At column 4, line 68, change "blacx" to ---black---.
At column 6, line 21, delete "3", insert "(i)".

Signed and Sealed this

Fifteenth Day of November, 1988

Attest:

DONALD J. QUIGG

*Attesting Officer*  *Commissioner of Patents and Trademarks*